United States Patent [19]

Lucchini

[11] Patent Number: 4,557,144
[45] Date of Patent: Dec. 10, 1985

[54] ELECTRIC LEVEL SENSOR FOR MOTOR VEHICLE FUEL TANKS

[75] Inventor: Giuseppe Lucchini, Turin, Italy

[73] Assignee: Fiat Auto S.p.A., Italy

[21] Appl. No.: 512,049

[22] Filed: Jul. 8, 1983

[30] Foreign Application Priority Data

Sep. 27, 1982 [IT] Italy ................ 53724/82[U]

[51] Int. Cl.⁴ .................................. G01F 23/10
[52] U.S. Cl. ........................... 73/313; 73/317; 338/33
[58] Field of Search ............... 73/313, 308; 338/33

[56] References Cited

U.S. PATENT DOCUMENTS

| | | | |
|---|---|---|---|
| 1,634,165 | 6/1927 | Williams | 338/33 X |
| 2,198,055 | 4/1940 | Liner | 338/33 X |
| 2,325,582 | 8/1943 | Anderson | 73/317 X |
| 4,184,370 | 1/1980 | Schlick et al. | 338/33 X |

*Primary Examiner*—Daniel M. Yasich
*Attorney, Agent, or Firm*—Sughrue, Mion, Zinn, Macpeak, and Seas

[57] ABSTRACT

An electric level sensor for motor vehicle fuel tanks comprises a potentiometer for continuously monitoring the level, which is constituted by an arcuate resistive track deposited on a ceramic plate and a resilient movable contact blade fixed for rotation with a pivoted arm which carries a float. When the level corresponds to the reserve fuel level, the movable blade is arranged to cooperate with a fixed contact constituted by an electrically conductive area formed on the ceramic plate near one end of the resistive track. The blade has a pair of studs for making contact with the track and the conductive area respectively.

14 Claims, 6 Drawing Figures

ELECTRIC LEVEL SENSOR FOR MOTOR VEHICLE FUEL TANKS

The present invention relates to an electric level sensor for motor vehicle fuel tanks, of the type comprising a potentiometer for continuously monitoring the level, constituted by an arcuate resistive track deposited on a plate of ceramic material and a resilient movable contact blade fixed for rotation with a pivoted arm carrying a float, and in which the blade is arranged to cooperate with a fixed contact when the level corresponds to the reserve fuel level.

Sensors of this type are already known in which the fixed contact for the reserve is constituted by a fixed resilient blade separate from said plate of ceramic material and is fixed in an insulating manner to a metal plate supporting said plate and pivoted on a shaft which carries the pivoting arm to which the blade is keyed.

The arrangement does not ensure that the position in which the movable blade contacts the fixed blade to indicate the reserve state is always the same from one sensor to another, since the ceramic plate and the fixed blade are fixed to the support plate independently of each other and the fixed blade may have a different shape from one sensor to another. This means that identical tanks do not have identical indications of the reserve fuel volume. Furthermore, the fixed blade may deform in the course of time with a consequent time variation of the angular position at which the movable blade establishes contact to light the reserve warning light. This results in uncertainty for the driver about the fuel reserve available whenever the warning light is on.

An object of the invention is to avoid this disadvantage. According to the present invention this object is achieved by means of a sensor of the type mentioned at the beginning, characterised in that the fixed contact is constituted by an electrically-conductive area formed on the plate adjacent one end of the resistive track, and the resilient movable blade has a pair of studs for making contact with the track and the conductive area respectively.

By virtue of this solution, the resistive track and the fixed contact constituted by the electrically conductive area occupy mutual angular positions which are independent of the assembly tolerances and which remain constant with time. Thus, it is ensured that the lighting of the reserve warning light occurs with good precision for the same volume of fuel both from one sensor to another and for any one sensor with the passage of time.

Other objects and advantages of the invention will become apparent from the detailed description which follows with reference to the appended drawings, given purely by way of non-limiting example, in which.

Figure 1:
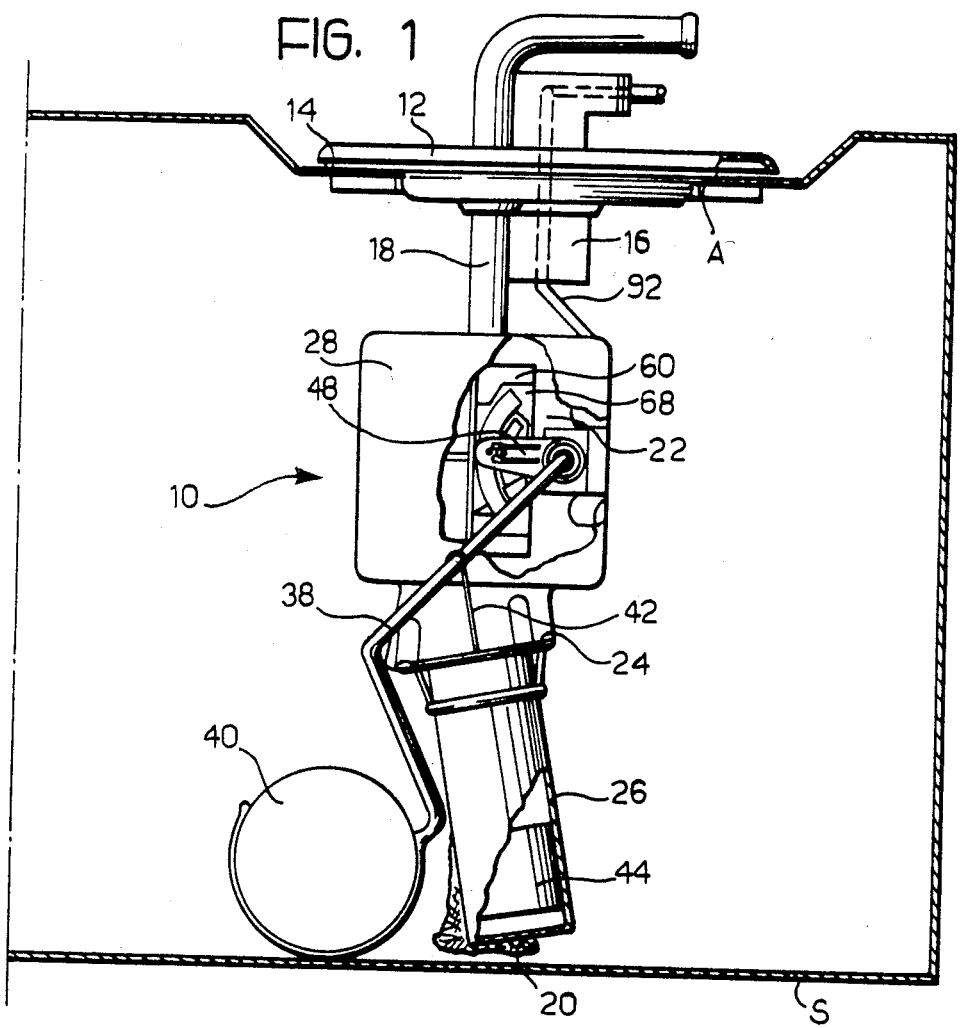
FIG. 1 is a partially cut-away elevational view of an electric level sensor according to the invention installed in a tank, shown partially.

Referring to FIG. 1, a motor vehicle fuel tank is indicated S. A fuel level sensor according to the invention is generally indicated 10.

The sensor 10 is inserted in the tank S through an aperture A in its upper wall and is provided with an upper metal flange 12 fixed with the interposition of a sealing gasket 14.

An electrical through-connector 16 passes through the flange 12 with a liquid-tight seal.

A metal breather pipe (not shown) and a metal fuel withdrawal pipe 18 also pass through the flange 12. The pipe 18 extends to near the bottom of the tank S where it is provided with a suction hose 20.

The pipe 18 acts as a support column for a metal plate 22. The plate 22 has a lower lug 24 bent at right angles, to which the upper end of a cylinder 26 is fixed.

A metal cover 28 is seamed to the plate 22 to enclose the components which will be described below.

Figure 2:
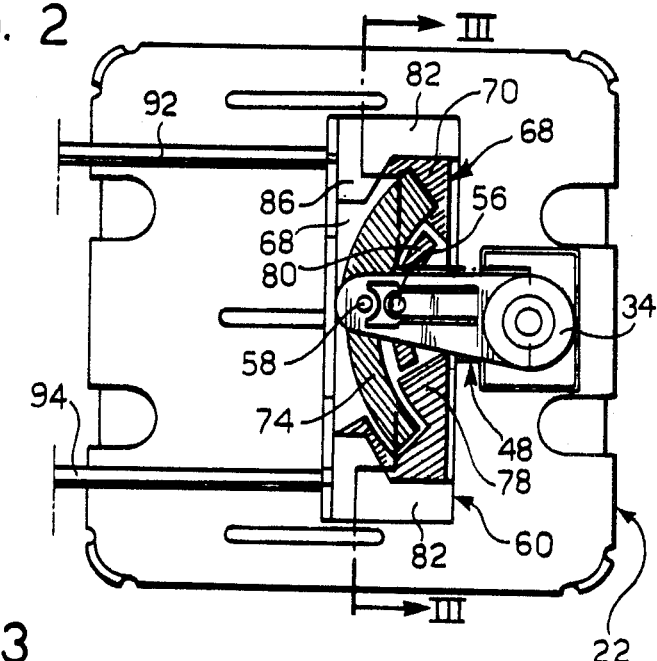
FIG. 2 is an elevational view of part of FIG. 1 on an enlarged scale.
Figure 3:
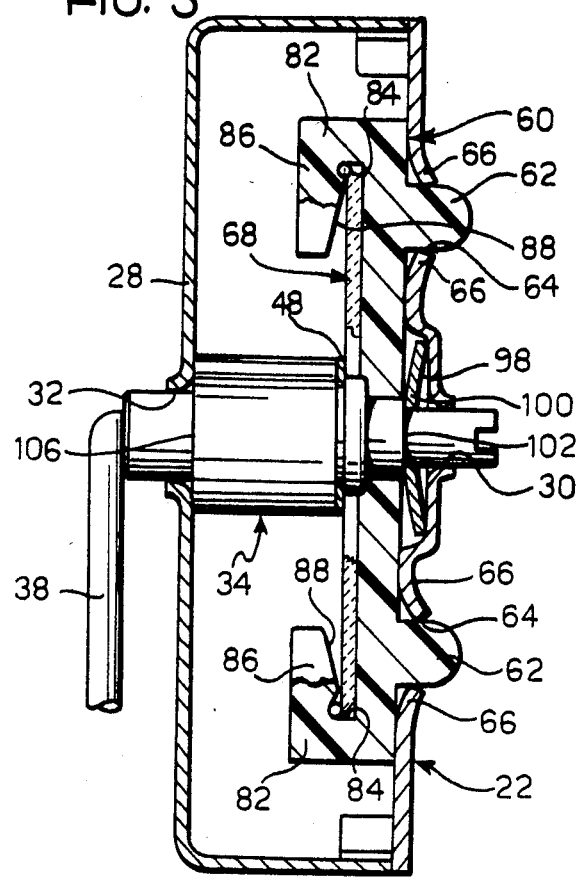
FIG. 3 is a section taken along the broken line III—III of FIG. 2.
Figure 4:
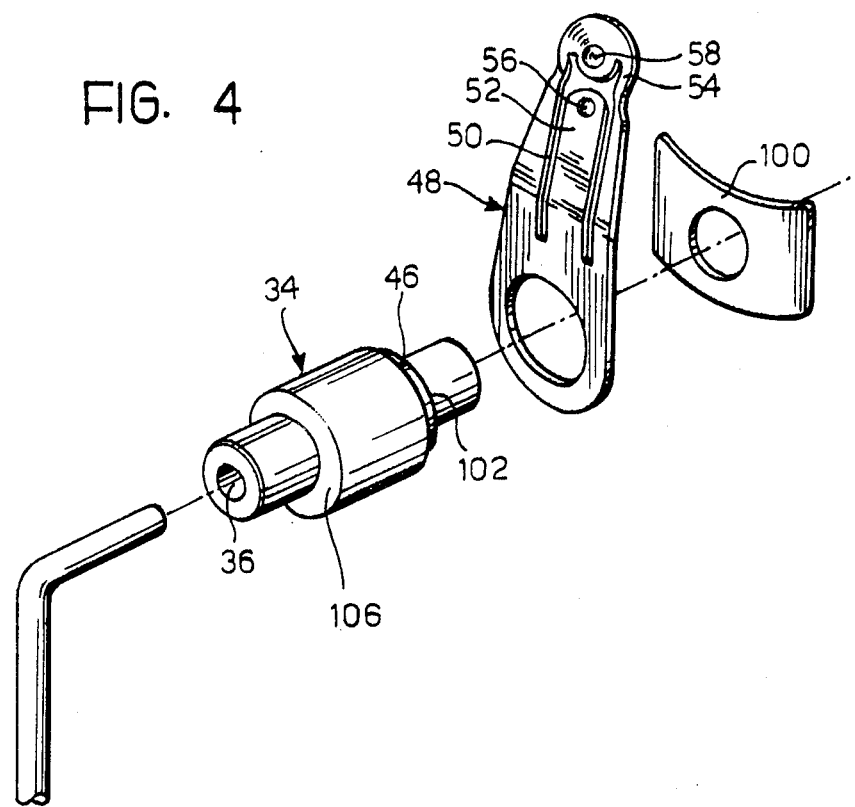
FIG. 4 is an exploded perspective view of the sensor shaft and some elements associated therewith.

As may be seen in FIG. 3, the ends of a shaft 34, also visible in FIGS. 2 and 4, are pivoted in two aligned holes 30, 32 in the plate 22 and the cover 28.

Starting from its end which projects from the cover 28, the shaft has a central hole 36 (FIG. 4) in which is engaged and rigidly fixed one end of a shaped arm 38 of metal rod, the free end of which carries a float 40 (FIG. 1).

A sheet metal tie 42 is coupled to the arm 38 and acts as a connecting rod for a piston 44 which is slidable in the cylinder 26 and has the known function of damping the oscillations of the arm 38 and the float 40.

A resilient contact blade 48 is keyed to an annular seat 46 (FIG. 4) on the shaft 34. The blade 48 is connected to the earth of the vehicle by means of the shaft 34, the plate 22, the tube 18, the flange 12, and the tank S.

As may be seen in FIGS. 2 and 4, the blade 48 is divided by an essentially U-shaped longitudinal slot 50 into a central blade part 52 and a peripheral U-shaped blade part 54. These two blade parts 52 and 54 are integral with each other at a zone of pivoting or keying on the shaft 34 and may thus bend independently of each other for the purpose which will be clarified below.

Each of the blade parts 52 and 54 has a respective drawn contact stud at its free end. These studs project from that face of the blade 48 opposite the one visible in FIGS. 1, 2 and 4, where they are indicated 56, 58 respectively.

Adjacent the shaft 34, a plate 60 of plastics material is fixed to the support plate 22. To advantage, the plate 69 has a pair of integral fixing pins 62 (FIG. 3). The metal plate 22 has a pair of apertures 64 in the pins 62 are a force-fit. More particularly, the apertures 64 are defined by opposing lamellar parts 66 cut in the plate 22. With the pins 62 inserted, the lamellar parts 66 are deformed, as shown in FIG. 3, so as to bite into the pins and oppose their removal. This arrangement allows assembly to be carried out rapidly surely, and with precise positioning of the plate 60 on the plate 22.

The plate 60 supports a plate 68 of ceramic material on its surface opposite that having the pins 62.

The exposed face of the plate 68 bears film deposits of different materials formed by a method similar to that used for making printed circuits. These film deposits will be described with reference to FIGS. 2 and 5.

At its two ends, the plate 68 has two distinct zones 70, 72 of electrically conductive material. An arcuate track 74 extends along the plate 68 concentric with the axis of the shaft 34 in the assembled condition. The track 74 is of electrically-resistive material. One of its ends (on the right in FIG. 5) partly covers the conductive or metallised zone 70 establishing electrical contact therewith.

The other conductive or metallised zone 72 is extended into a conductive area 78 located adjacent and radially inwardly of the end of the track 74 opposite that connected to the zone 70.

A concentric arcuate dummy track 80 of insulating material, preferably a vitrified material, extends adjacent and radially inwardly of the track 74. Preferably, the dummy track 80 extends to the metallised area 78 without a break.

Before going on to describe the function of the track 74, the area 78 and the dummy track 80, the manner in which the plate 68 is fixed to the support plate 60, and the manner in which the two metallised zones 70, 72 are connected electrically, will be described with particular reference to FIGS. 2, 3, and 6.

At its opposite ends, the plate 60 has respective grooved projections 82. The grooves of the projections 82, indicated 84, face each other.

The projections 82 also have respective resilient lugs 86 projecting towards each other.

The inwardly facing surfaces of the lugs 86, that is, those facing the plate 68 when it is assembled, have, starting from the free end of each lug, a face 88 which converges towards the plate and an arcuate recess 90 corresponding to the bottom of the groove 84.

Figure 6:
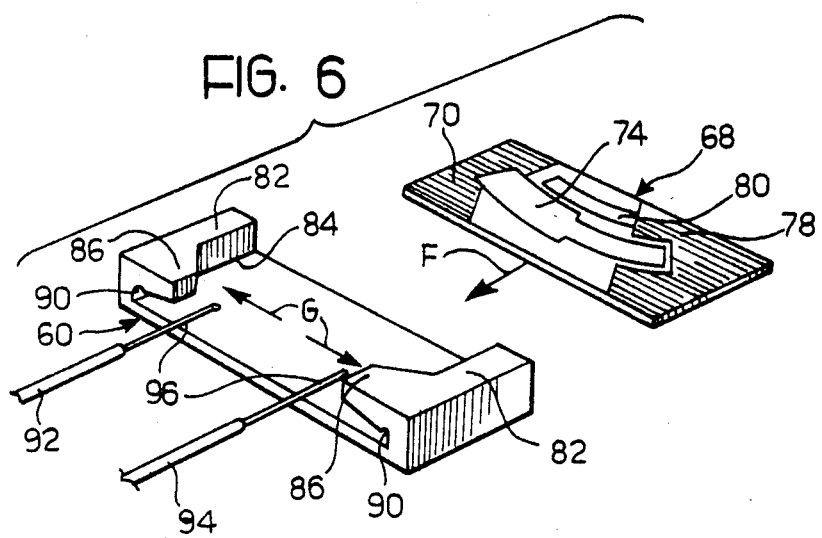
FIG. 6 is an exploded perspective view of the plate, its support plate, and of the ends of its electrical connecting wires, which serves to illustrate the assembly of these parts.

In order to fix the plate 68 to the plate 60, the opposite end edges of the plate 68 are inserted in the grooves 84 with a movement indicated by the arrow F in FIG. 6.

Through the connector 16 (FIG. 1) there extend two electric wires 92, 94, also visible in FIGS. 2 and 6.

Once the plate 68 has been positioned correctly on the plate 60, the bared ends 96 of the two wires 92, 94 are located as illustrated in FIG. 6, and the ends 96 are then moved apart (arrows G, FIG. 6), being inserted first in the flared mouths constituted by the inclined faces 88 and the outer surface of the plate 68. By virtue of their resilient properties, the lugs 86 open out and allow the bared ends 96 to be placed in the recesses 90 at the bottoms of the grooves 84. In this condition, the bared ends 96 of the wires 92, 94 remain firmly captive in the grooves 84 and in electrical contact with the respective metallised zones 70, 72, which extend to positions adjacent the opposite ends of the plate 68. Thus, the external electrical connections of the resistive strip 74 and the metallised area 78 are effected through the wires 92, 94 respectively.

As will be understood, the described method of electrical connection is quick, easy and economical since, among other things, soldering is not required.

In the assembled condition, the stud 58 of the blade 48 cooperates with the track 74 and the stud 56 cooperates, according to its position, with the contact area 78 and the dummy track 80. This cooperation is achieved by the resilient pressure due to the two blade parts 52, 54 of the blade 48 being bent (towards the right in FIG. 4) in the rest condition before assembly.

By virtue of the possibility of the two blade parts 52, 54 bending resiliently and independently, they do not interfere with each other during their sliding on the track 74 on the one hand, and on the contact area 78 and dummy track 80 on the other hand. This ensures particularly that the contact pressure of the stud 58 on the track 74 remains constant, avoiding irregularities and jumps in the electrical current passing through these elements.

As illustrated in FIGS. 3 and 4, a seat or rectangular recess 98 is formed in the metal plate 22 around the hole 30, in which a leaf-type blade spring 100 is housed. The latter bears at one end against the bottom of the seat 98 and at the other end against a shoulder 102 on the shaft 34. An opposing shoulder 106 on the shaft 34 bears against the cover 28. When the sensor is subject to an acceleration force towards the left in FIG. 3, the shaft 34, which is already maintained with its shoulder 106 against the cover 28 by the spring 100, cannot move and a good electrical contact between the blade 48 and the plate 68 is maintained. Acceleration forces towards the right in FIG. 3 may move the shaft 34, against the action of the spring 100, but this displacement merely improves the electrical contact.

The operation of the level sensor will now be described, further characteristics being emphasised.

The track 74 and the stud 58 of the blade constitute a potentiometer for transmitting to a level indicating voltmeter a voltage which is variable according to the volume of fuel in the tank. The higher the level and the higher the position of the float 40, the closer the stud 58 is to the connection zone 70 and the smaller the resistance of the potentiometer.

As the fuel level falls, the stud 58 moves downwardly along the track 74 with the descent of the float 40, which results in an increase in the resistance of the potentiometer and the transmission of a decreasing voltage signal.

When the fuel level in the tank reaches the value corresponding to the reserve, the stud 56 engages the contact area 78, closing the supply circuit of a warning light.

In all the angular positions of the blade 48 in which the stud 56 does not engage the contact area 78, this stud 56 slides on the dummy track 80. The latter, which as already stated is preferably of vitrified material, has the function of preventing contact between the stud 56 and the ceramic material of the plate 68, which would abrade the stud.

Figure 5:
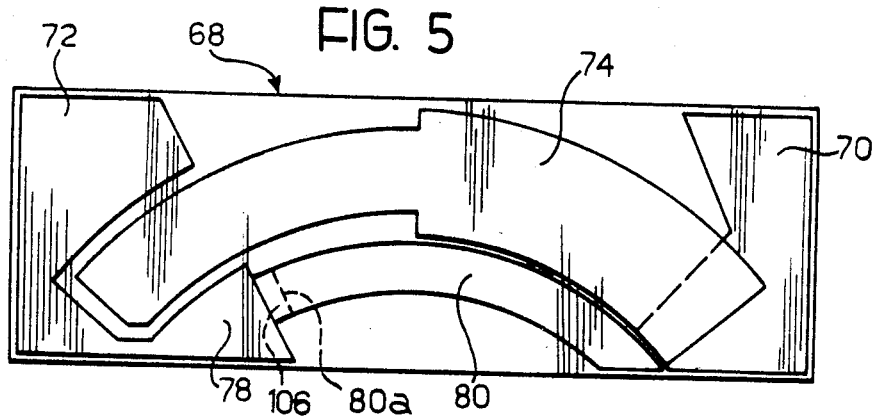
FIG. 5 is a front view on an enlarged scale of the plate appearing in FIGS. 1 to 3.

Alternatively, albeit less advantageously, the strip 80 could be metallised, that is, of the same material as the areas 72, 70. In this case, as illustrated in FIG. 5, the track 80 could terminate at 80a, at the end corresponding to the contact area 70, so as to present a small discontinuity 106 relative thereto. This version is slightly less advantageous in that the non-metallised zone 106 would be delimited by steps, even though small, which, over a long period, could cause wear of the stud 56 and also the transport of metal which could form a connecting bridge between the area 78 and the dummy track 80.

I claim:

1. An electric level sensor for motor vehicle fuel tanks comprising support means adapted to be mounted within a fuel tank, an arm carried by said support means for pivotal movement about a pivot axis, float means carried on one end of said arm, a potentiometer including a ceramic plate carried by said support means, an arcuate resistive track deposited on said ceramic plate concentric with said pivot axis, an arcuate dummy track concentric to and spaced from said arcuate resistive track and having a length shorter than said arcuate resistive track, a fixed contact comprised of an electrically conductive area formed on said ceramic plate in radially spaced relation to one end of said arcuate resistive track in arcuate alignment with said arcuate dummy track, a resilient moveable contact blade mounted for rotation with said pivoted arm and disposed radially relative to said pivot axis adjacent said ceramic plate, a pair of radially aligned studs on said resilient moveable contact blade in alignment with said arcuate tracks whereby arcuate movement of one of said studs in contact with said arcuate resistive track is adapted to provide a signal indicative of fuel level and arcuate movement of the other of said studs from contact with said arcuate dummy track to said fixed contact is adapted to provide a signal indicative of a fuel level corresponding to a reserve fuel level.

2. A sensor as defined in claim 1 wherein said fixed contact and said dummy track are located radially inwardly of said resistive track.

3. A sensor as defined in claim 2 wherein said dummy track is comprised of electrically conductive material and is spaced from said fixed contact by a gap free of electrically conductive material.

4. A sensor as defined in claim 2 wherein said dummy track is comprised of insulating material disposed in abutting relation with said fixed contact.

5. A sensor as defined in claim 4 wherein the insulating material is a vitrified material.

6. A sensor as defined in claim 1 wherein said resilient blade is divided by a substantially U-shaped longitudinal slot into a central blade part and a peripheral U-shaped blade part, said parts being integral with each other in a pivot zone and each carrying a respective one of said contact studs at its free end.

7. A sensor as defined in claim 1, wherein said support means includes a plastics plate which carries the ceramic plate, and a metal support plate to which the plastics plate is fixed.

8. A sensor as defined in claim 7, wherein the plastics plate has respective grooved projections at its opposite ends, the groove of said projections facing each other and housing respective opposite edges of the ceramic plate.

9. A sensor as defined in claim 8, wherein respective connection zones of electrically conductive material are carried by the edges of the ceramic plate housed in said grooves, one of the zones forming part of said conductive area and the other of the zones constituting an extension of said resistive track, and wherein the bared end of respective electric wires for the external connection of the sensor are inserted in said gooves.

10. A sensor as defined in claim 9, wherein said grooved projections have respective resilient lugs which project towards each other above the ceramic plate, said lugs having surfaces which face said plate and define, from the free end of each said lug, a surface converging towards the plate and a recess corresponding to the bottom of the respective groove, whereby each converging surface defines a flared mouth of the groove to facilitate the insertion of the bared end of the respective wire by a lateral movement towards the groove, and each recess acts as a seat for retaining this bared end in the groove against the respective said electrically conductive zone.

11. A sensor as defined in claim 7, wherein a metal cover is fixed to said metal support plate and encloses the ceramic plate and the resilient blade, and a shaft is pivoted in the cover, to which the blade is keyed.

12. A sensor as defined in claim 11, wherein a spring is interposed between said support plate and said shaft, and said shaft has one shoulder acted upon axially by said spring and a further shoulder maintained against the cover by the action of the spring on said one shoulder.

13. A sensor as defined in claim 7 wherein said plastics plate has a pair of integral pins on its surface opposite to that bearing the ceramic plate and said metal support plate has apertures in which said pins are secured by means of a force-fit.

14. A sensor as defined in claim 13 wherein the support plate has opposing lamellar parts cut therein and defining the apertures, the lamellar parts being deformed when the pins are inserted in the apertures so as to bit into the pins and oppose their removal.

* * * * *